3,214,334
FUNGICIDES EFFECTIVE AGAINST ERYSIPHACEAE
Heinz-Eberhard Freund and Kurt Röder, Berlin, Germany, assignors to Schering A. G., Berlin, Germany
No Drawing. Filed Dec. 1, 1964, Ser. No. 415,190
Claims priority, application Germany, Dec. 27, 1963, Sch 34,383
7 Claims. (Cl. 167—30)

This invention relates to fungicides, and more particularly to fungicides which are effective against powdery mildew of the family Erysiphaceae.

We have found that compounds of the formula

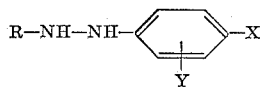

wherein R is the acyl radical of a monocarboxylic alkanoic acid having up to twelve carbon atoms, and each of X and Y is a member of the group consisting of hydrogen, methyl, and chlorine are fungicides effective against powdery mildew fungus of the family Erysiphaceae, both for protecting plants against attack, and for destroying the fungus on infested plants. Best results are achieved with the compounds of the invention in which R is the acyl radical of a straight-chained alkanoic acid having 6 to 10 carbon atoms.

Certain organic hydrazides and phenylhydrazides are known to have fungicidal effects. The known fungicides of this type, however, are effective only against those fungi which are also susceptible to other known fungicides, such as copper oxychloride and other copper compounds, and dithiocarbamates. The last mentioned fungicides are ineffective against powdery mildew caused by fungus of the family Erysiphaceae. The organic fungicides which are known to be toxic to Erysiphaceae are harmless to fungi which respond to treatment with copper oxychloride and dithiocarbamates (see "Principles of Fungicidal Action," by I. G. Horsfall, 1956, particularly pages 32–33). It was, therefore, surprising to find that the phenylhydrazides of the invention are highly effective in combating mildew fungus of the Erysiphaceae family, and in protecting plants against attack by the fungus.

We have also found that the compounds of the invention when applied in the amounts useful for combating fungus, are toxic to spider mites which are plant parasites, and this property is useful in cases of infestation by both types of parasites.

The compounds of the invention may be prepared in a conventional manner by reacting phenylhydrazine or its substituted derivatives with carboxylic acids, their halides, anhydrides, or esters.

Fungicidal compositions are prepared from the compounds of the invention in the manner customary in the pesticide art. Individual compounds or mixtures of several compounds of the invention may be applied to the fungus or to the plants to be protected with or without carriers and other adjuvants substantially non-toxic to the fungus, or in conjunction with other pesticides. The compositions are employed by dusting or spraying the plants to be protected or to be cured of fungus infestation.

According to the desired mode of application, the compositions may contain inert liquid or solid carriers, diluents, and surfactants to promote emulsion or dispersion of the ingredients, to improve wetting of plants by liquid composition and adherence of solid composition. Furthermore, the chosen ingredients are mixed in conventional apparatus.

Suitable liquid carriers include water, mineral oil and other organic solvents such as xylene, cyclohexanol, cyclohexanone, isophoron, chloroform, carbon tetrachloride, dimethylformamide, and dimethylsulfoxide. Suitable solid carriers are powdered limestone, kaolin, chalk, talcum, attaclay, and other types of clay. Representative surfactants are the salts of lignosulfonic acids, salts of alkylbenzenesulfonic acids, sulfonated organic acid amides and their salts, polyethoxylated amines, alcohols, and phenols.

The following examples are merely illustrative of the conventional methods suitable for preparing fungicidal composition of the invention.

EXAMPLE 1

The following ingredients (parts by weight) were mixed in a vessel equipped with a stirrer:

Caproyl-phenylhydrazide _____ 5
Emulsifier containing calcium dodecylbenzenesulfonate _____ 10
Dimethylformamide _____ 10
Xylene _____ 75

The mixture obtained formed an emulsion upon contact with water, the emulsion being suitable for spraying crops in the field from commercial equipment.

EXAMPLE 2

Solid compositions which were successfully employed in the field in the form of their aqueous suspensions were prepared by jointly grinding the ingredients of each of the following mixtures on a peg mill (parts by weight):

(A)

n-Heptanoyl-phenylhydrazide _____ 20
Wetting agent containing sodium β(oleyl-methylamino)-ethanesulfonate _____ 2
Calcium lignosulfonate _____ 8
Kaolin _____ 70

(B)

Pelargonyl-phenylhydrazide _____ 50
Wetting agent containing ethoxylated nonylphenol ___ 5
Calcium lignosulfonate _____ 15
Kaolin _____ 30

The powders obtained readily dispersed in water upon contact.

The amounts of the compositions that are to be applied to the plants for protecting them against fungus damage vary greatly, and it is not possible to state specific limits which would be generally applicable to the fungicidal compositions consisting of or containing the compounds of the invention. The nature, the manner of preparation, and the mode of application of the composition have a bearing on the effects achieved, and the dosage chosen in any particular instance will also depend on the results to be produced, on the specific fungus to be eliminated, and on the shape and size of the plants treated.

Those skilled in the art, however, will derive guidance from the following examples which show the effects of representative compounds of the invention when applied to various plants in the greenhouse and in open fields. To provide a uniform basis for comparison, the tests were performed with aqueous dispersions of solid compositions prepared in the manner of Example 2, the amounts of the inert ingredients being without influence on the effects achieved. Closely analogous results were achieved with compositions in which the active agents were dispersed in an aqueous carrier in the form of an emulsion prepared as described in Example 1.

In all tests described hereinafter, the portions of the plants above ground were sprayed with the aqueous dispersions of the active agents in a uniform manner. In the greenhouse tests, the fungicidal dispersions were permitted to dry on the plants, and the plants were then dusted with spores of the fungus. The protection obtained by the spraying thus is indicative of the prophylactic effect of the compounds of the invention. It was determined by inspecting fungus growth after 6 to 8 days.

In the field tests, plants which already were infested with the fungus were sprayed four times in the course of five to seven weeks, and the plants were inspected thereafter.

In all tests, untreated plants infested with the same fungus were employed as controls, and the results achieved with treated plants were evaluated as a percentage of the fungus damage to the untreated controls.

The compounds tested are identified by numbers in Table I, and are referred to by number in the subsequent examples. All compounds were of the formula

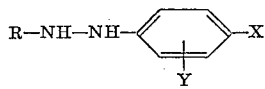

R—NH—NH—⟨ring⟩—X
                    Y and only the substituents are listed in Table I.

Table I

| Compound No. | Substituents R | X | Y |
|---|---|---|---|
| 1 | Formyl | H | H |
| 2 | Acetyl | H | H |
| 3 | Propionyl | H | H |
| 4 | Butyryl | H | H |
| 5 | Valeryl | H | H |
| 6 | Caproyl (n-hexanoyl) | H | H |
| 7 | n-Heptanoyl-1 (enanthoyl) | H | H |
| 8 | n-Octanoyl-1 (capryryl) | H | H |
| 9 | n-Nonanoyl-1 (pelargonyl) | H | H |
| 10 | n-Decanoyl-1- | H | H |
| 11 | n-Undecanoyl-1 | H | H |
| 12 | Lauroyl | H | H |
| 13 | Butyryl | CH³ | H |
| 14 | Valeryl | CH³ | H |
| 15 | Caproyl | CH³ | H |
| 16 | Enanthoyl | CH³ | H |
| 17 | Capryryl | CH³ | H |
| 18 | Pelargonyl | CH³ | H |
| 19 | n-Decanoyl-1 | CH³ | H |
| 20 | Acetyl | Cl | H |
| 21 | Propionyl | Cl | H |
| 22 | Butyryl | Cl | H |
| 23 | Valeryl | Cl | H |
| 24 | Caproyl | Cl | H |
| 25 | Enantloyl | Cl | H |
| 26 | Capryryl | Cl | H |
| 27 | Pelargonyl | Cl | H |
| 28 | n-Decanoyl | Cl | H |
| 29 | n-Undecanoyl-1 | Cl | H |
| 30 | Lauroyl | Cl | H |
| 31 | Propionyl | Cl | 2-CH³ |
| 32 | Butyryl | Cl | 2-CH³ |
| 33 | Valeryl | Cl | 2-CH³ |
| 34 | Capryryl | Cl | 2-CH³ |
| 35 | Pelargonyl | Cl | 2-CH³ |
| 36 | Propionyl | Cl | 3-Cl |
| 37 | Butyryl | Cl | 3-Cl |
| 38 | Valeryl | Cl | 3-Cl |
| 39 | Caproyl | Cl | 3-Cl |
| 40 | Enanthoyl | Cl | 3-Cl |

Table I—Continued

| Compound No. | Substituents R | X | Y |
|---|---|---|---|
| 41 | Capryryl | Cl | 3-Cl |
| 42 | Pelargonyl | Cl | 3-Cl |
| 43 | n-Decanoyl-1 | Cl | 3-Cl |
| 44 | Trimethylacetyl | H | H |
| 45 | Trimethylacetyl | Cl | H |
| 46 | Trimethylacetyl | Cl | 2-CH³ |
| 47 | Trimethylacetyl | Cl | 3-Cl |
| 48 | α, α-Dimethylvaleryl | Cl | H |
| 49 | α, α-Dimethylvaleryl | Cl | 2-CH³ |
| 50 | α, α-Dimethylvaleryl | Cl | 3-Cl |
| 51 | α, α, γ, γ,-Tetramethylvaleryl | Cl | H |
| 52 | α-Methylvaleryl | H | H |
| 53 | Acetyl | Cl | 2-CH³ |
| 54 | n-Undecanoyl-1 | Cl | 3-Cl |
| 55 | Lauroyl | Cl | 3-Cl |

In the following Examples 3, 4 and 6 aqueous dispersions containing the active agents were applied in amounts of 1,000 liters per hectare, and in Example 5 with 2,000 liters per hectare.

EXAMPLE 3

Healthy pumpkins plants were sprayed in the greenhouse with aqueous dispersions containing the active agents listed below in the indicated concentration (p.p.m.), and the fungus damage on the treated plants and on untreated controls was compared after the plants had been infected with spores of Erysiphe cichoracearum.

| Compound No. | Fungus Damage (Percent) After Treatment With— | | | |
|---|---|---|---|---|
| | 1,000 p.p.m. | 500 p.p.m. | 200 p.p.m. | 50 p.p.m. |
| 1 | 13 | 27 | 76 | |
| 2 | 41 | 57 | 74 | |
| 3 | 3 | 11 | 37 | |
| 4 | 5 | 20 | 33 | |
| 5 | | | 37 | |
| 6 | 0 | 1 | 12 | 35 |
| 7 | 0 | 0 | 0 | 13 |
| 8 | 0 | 0 | 5 | 17 |
| 9 | 0 | 0 | 1 | 20 |
| 10 | 0 | 0 | 3 | 25 |
| 11 | 4 | 16 | 98 | |
| 12 | 0 | 1 | 44 | |
| 13 | | | 29 | 77 |
| 14 | | | 36 | 63 |
| 15 | | | 7 | 27 |
| 16 | | | 1 | 19 |
| 17 | | | 11 | 52 |
| 18 | | | 8 | 57 |
| 19 | | | 2 | 49 |
| 20 | 7 | 52 | 76 | |
| 21 | 12 | 51 | 60 | |
| 22 | 0 | 19 | 35 | |
| 23 | 0 | 1 | 10 | 21 |
| 24 | 2 | 3 | 18 | 45 |
| 25 | 0 | 0 | 7 | 12 |
| 26 | 0 | 9 | 37 | |
| 27 | 0 | 1 | 7 | 25 |
| 28 | 4 | 18 | 35 | |
| 29 | 11 | 40 | 68 | |
| 30 | 38 | 52 | 94 | |
| 31 | 9 | 39 | 58 | |
| 32 | 4 | 18 | 43 | |
| 33 | 0 | 8 | 47 | 47 |
| 34 | | | 23 | 43 |
| 35 | | | 20 | 57 |
| 36 | 32 | 48 | 61 | |
| 37 | 21 | 36 | 60 | |
| 38 | 18 | 29 | 55 | |
| 39 | 9 | 22 | 40 | |
| 40 | 10 | 22 | 61 | |
| 41 | 13 | 45 | 70 | |
| 42 | 15 | 33 | 62 | |
| 43 | 26 | 50 | 73 | |
| 44 | 38 | | | |
| 45 | 12 | 42 | 54 | |
| 46 | 13 | 60 | 69 | |
| 47 | 15 | 83 | 85 | |
| 48 | 12 | 43 | 74 | |
| 49 | 3 | 34 | 44 | |
| 50 | 23 | 56 | 71 | |
| 51 | 19 | 65 | | |
| 52 | 13 | | 45 | |
| Untreated | 100 | | | |

EXAMPLE 4

Healthy barley plants were sprayed in the greenhouse, and infected with spores of Erysiphe graminis f.sp. hordei in the manner described in Example 3. The results obtained are listed below.

| Compound No. | Fungus Damage (Percent) After Treatment With— | | | | |
|---|---|---|---|---|---|
| | 2,000 p.p.m. | 1,000 p.p.m. | 400 p.p.m. | 100 p.p.m. | 25 p.p.m. |
| 1 | 20 | 44 | | | |
| 2 | 16 | 27 | | | |
| 3 | 10 | 18 | 23 | | |
| 4 | 12 | 20 | 25 | 35 | |
| 6 | 3 | 3 | 7 | 9 | 19 |
| 7 | 1 | 1 | 5 | 15 | 21 |
| 8 | 2 | 11 | 10 | 27 | 33 |
| 9 | 8 | 12 | 17 | 25 | 32 |
| 10 | 14 | 17 | 25 | 35 | |
| 11 | 20 | 38 | 40 | | |
| 15 | | | 2 | 10 | 18 |
| 16 | | | 6 | 11 | 15 |
| 17 | | | 2 | 8 | 9 |
| 21 | 19 | 36 | 52 | | |
| 22 | 17 | 36 | | | |
| 23 | 6 | 18 | 21 | 36 | |
| 24 | 11 | 23 | | | |
| 25 | 17 | 25 | | | |
| 26 | 13 | 17 | | | |
| 27 | 20 | 37 | | | |
| 28 | 33 | 63 | 75 | | |
| 29 | 33 | 60 | | | |
| 53 | 15 | 34 | | | |
| 31 | 16 | 27 | 45 | | |
| 32 | 13 | 24 | | | |
| 33 | 12 | 24 | | | |
| 36 | 21 | 34 | 54 | | |
| 37 | 26 | 56 | | | |
| 38 | 24 | 34 | | | |
| 39 | 13 | 31 | | | |
| 40 | 24 | 57 | 68 | | |
| 41 | 26 | 58 | | | |
| 42 | 33 | 64 | | | |
| 43 | 27 | 59 | | | |
| 54 | 40 | 70 | | | |
| 55 | 34 | 62 | | | |
| 46 | 9 | 30 | 53 | | |
| 49 | 38 | 63 | 75 | | |
| Untreated | | | 100 | | |

EXAMPLE 5

Field plots carrying roses infested with *Sphaerotheca pannosa* were sprayed with aqueous dispersions containing 500 parts per million of the compounds listed below. One plot was left untreated and served as a control. The fungus damage on treated and untreated roses was compared.

Compound No: Fungus damage, percent
6 _____ 22
7 _____ 22
8 _____ 26
9 _____ 26
Untreated _____ 100

EXAMPLE 6

Field plots carrying clover infested with *Erysiphe polygoni* were sprayed with aqueous dispersions containing 250 parts per million of the compounds listed below, and the results were evaluated as in Example 5.

Compound No: Fungus damage, percent
6 _____ 22
7 _____ 16
8 _____ 20
9 _____ 18
Untreated _____ 100

Analogous results were obtained with field plots carrying apple-trees infested with *Podosphaera leucotricha*, and vines infested with *Uncinula necator*.

While the invention has been described with particular reference to specific embodiments, it is to be understood that it is not limited thereto, but is to be construed broadly and restricted solely by the scope of the appended claims.

What is claimed is:
1. A method of destroying fungus of the family Erysiphaceae which comprises applying to said fungus a fungicidal amount of a compound of the formula

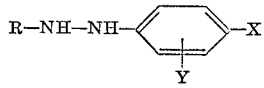

wherein R is the acyl radical of a monocarboxylic alkanoic acid having not more than twelve carbon atoms, and each of X and Y is a member of the group consisting of hydrogen, methyl, and chlorine.
2. A method as set forth in claim 1 wherein said alkanoic acid has six to ten carbon atoms.
3. A method as defined in claim 1, wherein said alkanoic acid is caproic.
4. A method as defined in claim 1, wherein said alkanoic acid is enanthoic.
5. A method as defined in claim 1, wherein said alkanoic acid is caprylic.
6. A method as defined in claim 1, wherein said alkanoic acid is pelargonic.
7. A method as defined in claim 1, wherein said alkanoic acid is capric.

References Cited by the Examiner

Bottger et al., U.S.D.A. Bull. E–769 (March 1949), pp. 1–3.

JULIAN S. LEVITT, *Primary Examiner*.